(12) United States Patent
Woodell et al.

(10) Patent No.: US 7,889,117 B1
(45) Date of Patent: Feb. 15, 2011

(54) LESS THAN FULL APERTURE HIGH RESOLUTION PHASE PROCESS FOR TERRAIN ELEVATION ESTIMATION

(75) Inventors: Daniel L. Woodell, Cedar Rapids, IA (US); Richard D. Jinkins, Rewey, WI (US); Richard M. Rademaker, Rijswijk ZH (NL)

(73) Assignee: Rockwell Collins, Inc., Cedar Rapids, IA (US)

( * ) Notice: Subject to any disclaimer, the term of this patent is extended or adjusted under 35 U.S.C. 154(b) by 322 days.

(21) Appl. No.: 12/167,200

(22) Filed: Jul. 2, 2008

(51) Int. Cl.
*G01S 13/42* (2006.01)
(52) U.S. Cl. .................................. 342/65; 342/148
(58) Field of Classification Search .................. 342/65, 342/147, 148
See application file for complete search history.

(56) References Cited

U.S. PATENT DOCUMENTS

| | | | |
|---|---|---|---|
| 2,930,035 A | 3/1960 | Altekruse | |
| 2,965,894 A | 12/1960 | Sweeney | |
| 2,994,966 A | 8/1961 | Senitsky et al. | |
| 3,153,234 A | 10/1964 | Begeman et al. | |
| 3,212,088 A | 10/1965 | Alexander et al. | |
| 3,241,141 A | 3/1966 | Wall | |
| 3,325,807 A | 6/1967 | Burns et al. | |
| 3,397,397 A | 8/1968 | Barney | |
| 3,680,094 A | 7/1972 | Bayle et al. | |
| 3,739,380 A | 6/1973 | Burdic et al. | |
| 3,810,175 A * | 5/1974 | Bell | 342/183 |
| 3,815,132 A * | 6/1974 | Case et al. | 342/65 |
| 4,024,537 A * | 5/1977 | Hart | 342/65 |
| 4,058,710 A | 11/1977 | Altmann | |
| 4,760,396 A | 7/1988 | Barney et al. | |
| 4,924,401 A | 5/1990 | Bice et al. | |
| 5,332,998 A | 7/1994 | Avignon et al. | |
| 5,559,518 A | 9/1996 | Didomizio | |
| 5,831,570 A * | 11/1998 | Ammar et al. | 342/26 B |
| 5,867,119 A | 2/1999 | Corrubia et al. | |
| 5,923,279 A | 7/1999 | Bamler et al. | |
| 5,945,926 A | 8/1999 | Ammar et al. | |
| 6,023,240 A | 2/2000 | Sutton | |
| 6,064,942 A | 5/2000 | Johnson et al. | |
| 6,128,553 A | 10/2000 | Gordon et al. | |
| 6,150,901 A | 11/2000 | Auken | |
| 6,154,151 A | 11/2000 | McElreath et al. | |
| 6,163,021 A | 12/2000 | Mickelson | |
| 6,166,661 A | 12/2000 | Anderson et al. | |

(Continued)

OTHER PUBLICATIONS

Skolnik, Merrill I. Radar Handbook (McGraw Hill Book Company, New York, 1990, $2^{nd}$ edition, pp. 18.37-18.57).

(Continued)

*Primary Examiner*—John B Sotomayor
(74) *Attorney, Agent, or Firm*—Matthew J. Evans; Daniel M. Barbieri

(57) ABSTRACT

A method of determining an angle with a beam to terrain for a terrain avoidance system includes receiving first data associated with first returns associated with a first portion of an antenna. The method further includes receiving second data associated with second returns associated with a second portion of the antenna, wherein the first portion is different than, intersects, or includes the second portion. The method further includes determining the angle to terrain using the first data and second data.

20 Claims, 9 Drawing Sheets

U.S. PATENT DOCUMENTS

| | | |
|---|---|---|
| 6,169,770 B1 | 1/2001 | Henely |
| 6,178,391 B1 | 1/2001 | Anderson et al. |
| 6,194,980 B1 | 2/2001 | Thon |
| 6,201,494 B1 | 3/2001 | Kronfeld |
| 6,204,806 B1 | 3/2001 | Hoech |
| 6,259,400 B1 | 7/2001 | Higgins et al. |
| 6,266,114 B1 | 7/2001 | Skarohlid |
| 6,281,832 B1 | 8/2001 | McElreath |
| 6,285,298 B1 | 9/2001 | Gordon |
| 6,285,337 B1 | 9/2001 | West et al. |
| 6,285,926 B1 | 9/2001 | Weiler et al. |
| 6,317,872 B1 | 11/2001 | Gee et al. |
| 6,345,127 B1 | 2/2002 | Mitchell |
| 6,359,585 B1 | 3/2002 | Bechman et al. |
| 6,373,418 B1 | 4/2002 | Abbey |
| 6,374,286 B1 | 4/2002 | Gee et al. |
| 6,377,892 B1 | 4/2002 | Johnson et al. |
| 6,388,607 B1 | 5/2002 | Woodell |
| 6,388,608 B1 | 5/2002 | Woodell et al. |
| 6,421,000 B1 | 7/2002 | McDowell |
| 6,424,288 B1 | 7/2002 | Woodell |
| 6,426,717 B1 | 7/2002 | Maloratsky |
| 6,441,773 B1 | 8/2002 | Kelly et al. |
| 6,448,922 B1 | 9/2002 | Kelly |
| 6,452,511 B1 | 9/2002 | Kelly et al. |
| 6,456,236 B1 | 9/2002 | Hauck et al. |
| 6,473,240 B1 | 10/2002 | Dehmlow |
| 6,492,934 B1 | 12/2002 | Hwang et al. |
| 6,512,476 B1 | 1/2003 | Woodell |
| 6,520,056 B1 | 2/2003 | Nemeth et al. |
| 6,525,674 B1 | 2/2003 | Kelly et al. |
| 6,531,669 B1 | 3/2003 | Miller et al. |
| 6,549,161 B1 | 4/2003 | Woodell |
| 6,567,728 B1 | 5/2003 | Kelly et al. |
| 6,574,030 B1 | 6/2003 | Mosier |
| 6,577,947 B1 | 6/2003 | Kronfeld et al. |
| 6,590,528 B1 | 7/2003 | DeWulf |
| 6,603,425 B1 | 8/2003 | Woodell |
| 6,650,275 B1 | 11/2003 | Kelly et al. |
| 6,650,291 B1 | 11/2003 | West et al. |
| 6,690,298 B1 | 2/2004 | Barber et al. |
| 6,690,299 B1 | 2/2004 | Suiter |
| 6,697,008 B1 | 2/2004 | Sternowski |
| 6,710,663 B1 | 3/2004 | Berquist |
| 6,714,186 B1 | 3/2004 | Mosier et al. |
| 6,724,344 B1 | 4/2004 | Stockmaster et al. |
| 6,738,011 B1 | 5/2004 | Evans |
| 6,741,203 B1 | 5/2004 | Woodell |
| 6,741,208 B1 | 5/2004 | West et al. |
| 6,744,382 B1 | 6/2004 | Lapis et al. |
| 6,744,408 B1 | 6/2004 | Stockmaster |
| 6,757,624 B1 | 6/2004 | Hwang et al. |
| 6,771,626 B1 | 8/2004 | Golubiewski et al. |
| 6,782,392 B1 | 8/2004 | Weinberger et al. |
| 6,804,614 B1 | 10/2004 | McGraw et al. |
| 6,806,846 B1 | 10/2004 | West |
| 6,807,538 B1 | 10/2004 | Weinberger et al. |
| 6,813,777 B1 | 11/2004 | Weinberger et al. |
| 6,819,983 B1 | 11/2004 | McGraw |
| 6,822,617 B1 | 11/2004 | Mather et al. |
| 6,825,804 B1 | 11/2004 | Doty |
| 6,839,017 B1 | 1/2005 | Dillman |
| 6,850,185 B1 | 2/2005 | Woodell |
| 6,862,323 B1 | 3/2005 | Loper |
| 6,879,280 B1 | 4/2005 | Bull et al. |
| 6,882,302 B1 | 4/2005 | Woodell et al. |
| 6,918,134 B1 | 7/2005 | Sherlock et al. |
| 6,933,885 B1 | 8/2005 | Stockmaster et al. |
| 6,938,258 B1 | 8/2005 | Weinberger et al. |
| 6,950,062 B1 | 9/2005 | Mather et al. |
| 6,959,057 B1 | 10/2005 | Tuohino |
| 6,972,727 B1 | 12/2005 | West et al. |
| 6,977,608 B1 | 12/2005 | Anderson et al. |
| 6,995,726 B1 | 2/2006 | West et al. |
| 6,998,908 B1 | 2/2006 | Sternowski |
| 6,999,022 B1 | 2/2006 | Vesel et al. |
| 6,999,027 B1 | 2/2006 | Stockmaster |
| 7,002,546 B1 | 2/2006 | Stuppi et al. |
| 7,028,304 B1 | 4/2006 | Weinberger et al. |
| 7,034,753 B1 | 4/2006 | Elsallal et al. |
| 7,069,120 B1 | 6/2006 | Koenck et al. |
| 7,089,092 B1 | 8/2006 | Wood et al. |
| 7,092,645 B1 | 8/2006 | Sternowski |
| 7,109,912 B1 | 9/2006 | Paramore et al. |
| 7,109,913 B1 | 9/2006 | Paramore et al. |
| 7,129,885 B1 | 10/2006 | Woodell et al. |
| 7,148,816 B1 | 12/2006 | Carrico |
| 7,151,507 B1 | 12/2006 | Herting |
| 7,158,072 B1 | 1/2007 | Venkatachalam et al. |
| 7,161,525 B1 | 1/2007 | Finley et al. |
| 7,170,446 B1 | 1/2007 | West et al. |
| 7,170,959 B1 | 1/2007 | Abbey |
| 7,196,329 B1 | 3/2007 | Wood et al. |
| 7,205,933 B1 | 4/2007 | Snodgrass |
| 7,219,011 B1 | 5/2007 | Barber |
| 7,242,343 B1 | 7/2007 | Woodell |
| 7,250,903 B1 | 7/2007 | McDowell |
| 7,269,657 B1 | 9/2007 | Alexander et al. |
| 7,272,472 B1 | 9/2007 | McElreath |
| 7,292,178 B1 | 11/2007 | Woodell et al. |
| 7,307,583 B1 | 12/2007 | Woodell et al. |
| 7,423,578 B1 | 9/2008 | Tietjen |
| 7,479,920 B2 * | 1/2009 | Niv ............................ 342/65 |
| 7,609,200 B1 | 10/2009 | Woodell et al. |
| 7,633,430 B1 * | 12/2009 | Wichgers et al. ............. 342/65 |
| 7,783,427 B1 * | 8/2010 | Woodell et al. ............. 701/301 |
| 7,791,529 B2 * | 9/2010 | Filias et al. .................. 342/115 |
| 7,808,422 B1 * | 10/2010 | Woodell et al. ........... 342/26 B |
| 2004/0264549 A1 | 12/2004 | Hoole |
| 2008/0018524 A1 | 1/2008 | Christianson |
| 2008/0111731 A1 | 5/2008 | Hubbard et al. |

OTHER PUBLICATIONS

U.S. Appl. No. 12/167,208, filed Jul. 2, 2008, Dickerson et al.
U.S. Appl. No. 12/167,203, filed Jul. 2, 2008, Woodell.
U.S. Appl. No. 11/900,002, filed Sep. 6, 2007, Woodell et al.
U.S. Appl. No. 11/899,801, filed Sep. 6, 2007, Woodell et al.
U.S. Appl. No. 11/863,221, filed Sep. 27, 2007, Woodell.
U.S. Appl. No. 11/863,219, filed Sep. 27, 2007, Woodell.
U.S. Appl. No. 11/863,215, filed Sep. 27, 2007, Woodell.
U.S. Appl. No. 11/851,323, filed Sep. 6, 2007, McCusker.
Technical Standard Order, TSO-C115b, Airborne Area Navigation Equipment Using Multi-Sensor Inputs, Sep. 30, 1994, 11 pages, Department of Transportation, Federal Aviation Administration, Washington, DC.

\* cited by examiner

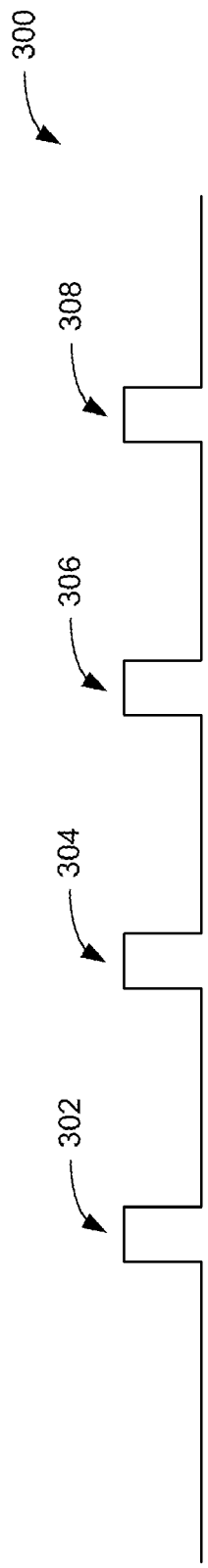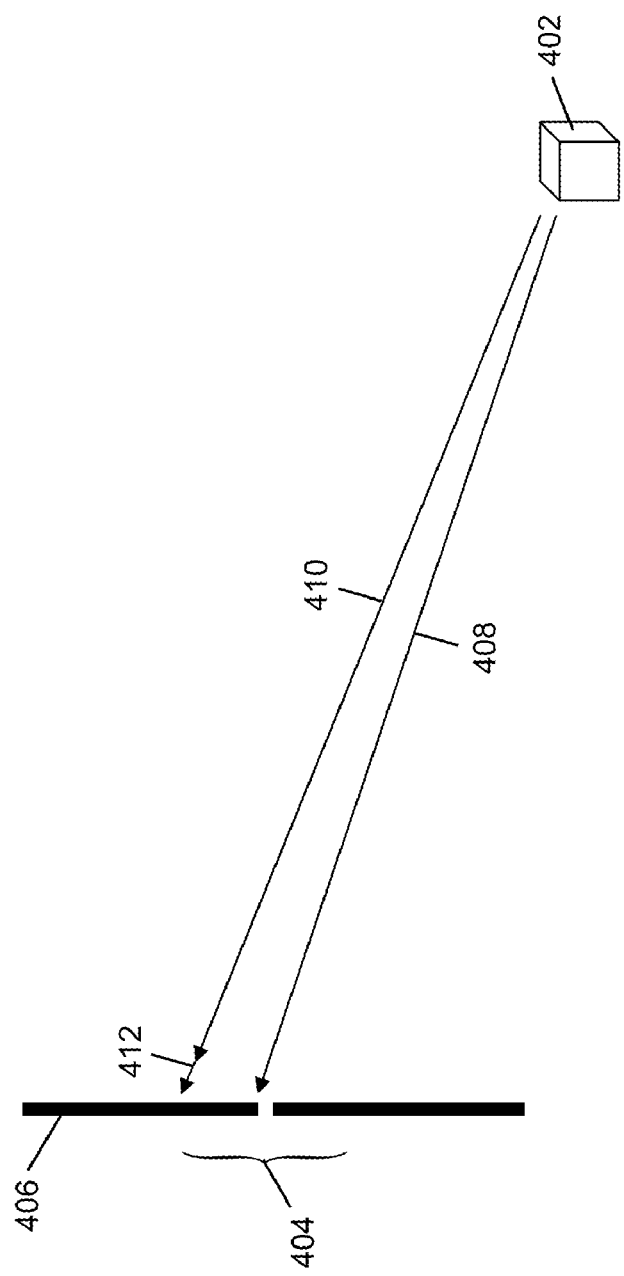

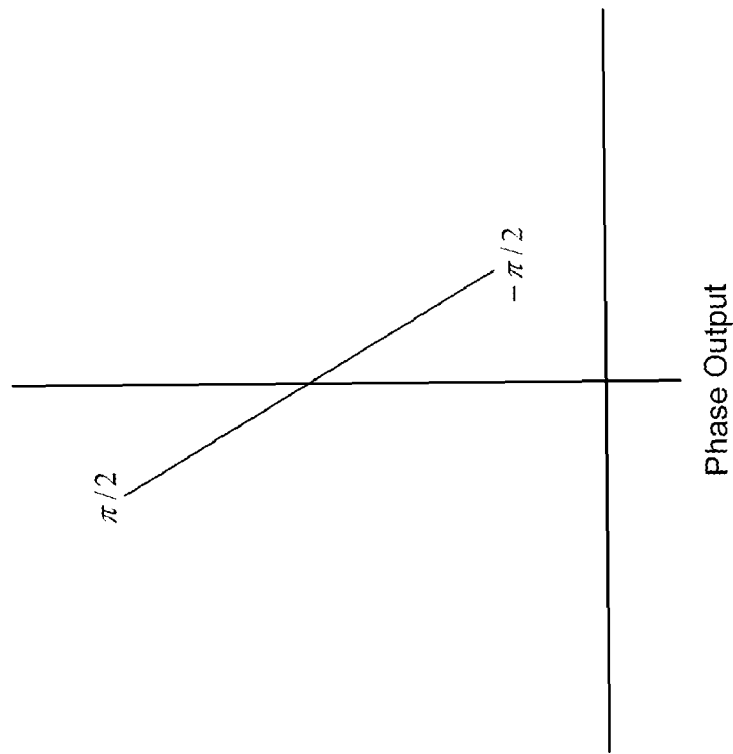
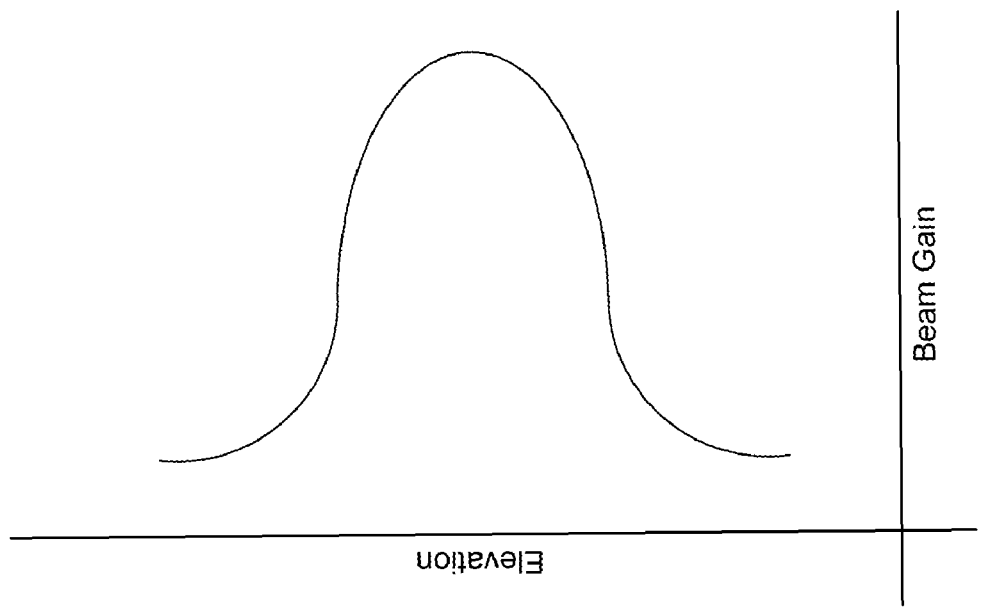
FIG. 12

LESS THAN FULL APERTURE HIGH RESOLUTION PHASE PROCESS FOR TERRAIN ELEVATION ESTIMATION

CROSS-REFERENCE TO RELATED APPLICATIONS

This application is related to U.S. patent application Ser. No. 11/863,215, entitled "METHOD AND APPARATUS FOR ESTIMATING TERRAIN ELEVATION USING A NULL RESPONSE", filed on Sep. 27, 2007 by Woodell, U.S. patent application Ser. No. 11/863,219, entitled "NULL STEERING SYSTEM AND METHOD FOR TERRAIN ESTIMATION", filed on Sep. 27, 2007, by Woodell, U.S. patent application Ser. No. 11/863,221, entitled "HALF APERTURE ANTENNA RESOLUTION SYSTEM AND METHOD", filed on Sep. 27, 2007 by Woodell, U.S. patent application Ser. No. 12/167,203, entitled "SYSTEM AND METHOD OF SEQUENTIAL LOBING USING LESS THAN FULL APERTURE ANTENNA TECHNIQUES", filed on an even date herewith by Woodell, and U.S. patent application Ser. No. 12/167,208 entitled "RADAR ANTENNA STABILIZATION ENHANCEMENT USING VERTICAL BEAM SWITCHING" filed on an even date herewith by Dickerson, et al., all assigned to the Assignee of this patent application and incorporated in their entireties herein by reference.

BACKGROUND

The present disclosure relates generally to the field of radars. More specifically, the present disclosure relates to angle estimation associated with terrain and/or targets.

Radar systems include weather radar systems, radar guidance and/or targeting systems, and terrain awareness and warning systems ("TAWS"). According to one example, a radar-based TAWS relies on radar to determine the location of terrain with respect to the aircraft. To determine the location of terrain, the radar system generally must determine the angle within the beam to the terrain. The accuracy of the location function is dependent upon the ability to resolve the angle within the beam to the terrain. Terrain following systems have a comparable need to determine the location of terrain. Similarly, weather radar systems and military systems require that an angle within the beam to a target and/or weather be determined.

Certain conventional systems use monopulse processing, which requires two receiver channels. However, the use of monopulse processing may be costly and may be limited in its accuracy, producing angle estimates with standard deviations no better than the beamwidth divided by 10 to the beamwidth divided by 16 at high signal-to-noise ratios.

Terrain angle may also be found with the analysis of multiple radar beam sweeps across azimuth with different beam elevations. However, multiple beam analysis generally requires that the data derived from each scan is correlated in the average but not with any given sample. Accordingly, in conventional multiple beam analysis systems, multiple scan passes across the data are required and substantial scan to scan filtering is needed before the ratio of powers may be used to estimate terrain angle. The result can be susceptible to noise.

Sequential amplitude lobing has been suggested as a possible solution to terrain and/or target angle estimation. The hardware requirements for sequential amplitude lobing is minimal (a single switch and single receiver) and the method has some advantages when operating in weather. However, the method is limited in precision to somewhat less than what is available via a monopulse system.

Thus, there is a need for a more accurate system and method for determining a target angle or angle within the beam to the terrain. There is also a need for a system and method for angle determination that requires only minimal hardware but has accuracy better than that available with a monopulse system, providing good detection characteristics and limiting false alarm characteristics.

It would be desirable to provide a system and/or method that provides one or more of these or other advantageous features. Other features and advantages will be made apparent from the present specification. The teachings disclosed extend to those embodiments which fall within the scope of the appended claims, regardless of whether they accomplish one or more of the aforementioned needs.

SUMMARY

One embodiment of the present disclosure relates to a method of determining an angle within a beam to terrain for a terrain avoidance system. The method comprises receiving first data associated with first returns associated with a first portion of an antenna. The method further comprises receiving second data associated with second returns associated with a second portion of the antenna, wherein the first portion is different than, intersects, or includes the second portion. The method further comprises determining the angel to the terrain using the first and second data.

Another embodiment of the present disclosure relates to a radar system coupled to a radar antenna for receiving radar returns. The radar system provides angle data associated with an angle to terrain. The radar system comprises a processor to receive data associated with the radar returns. The processor receives first data associated with a first portion of the antenna and second data associated with a second portion of the antenna, wherein the first portion is within, intersects, or is exclusive of the second portion. The processor calculates the angle within the beam to the terrain using the first and second data.

Yet another embodiment of the present disclosure relates to an apparatus. The apparatus comprises means for receiving radar returns from a target. The apparatus further comprises means for receiving first data associated with first returns associated with a first portion of an antenna. The apparatus further comprises means for receiving second data associated with second returns associated with a second portion of an antenna, wherein the first portion includes, intersects, or is exclusive of the second portion. The apparatus further comprises means for determining an angle within the beam to the terrain using the first and second data.

Alternative exemplary embodiments relate to other features and combinations of features as may be generally recited in the claims.

BRIEF DESCRIPTION OF THE DRAWINGS

The invention will become more fully understood from the following detailed description, taken in conjunction with the accompanying drawings, wherein like reference numerals refer to like elements, in which:

FIG. 3 is an illustration of a pulse beam, according to an exemplary embodiment;

FIG. 4 is an illustration of a target and the distance between a target and full aperture and target and half aperture, according to an exemplary embodiment;

FIG. 12 includes graphs showing elevation versus beam gain and elevation versus complex conjugate phase angle for exemplary returns associated with the system illustrated in FIG. 9;

DETAILED DESCRIPTION OF THE EXEMPLARY EMBODIMENTS

Figure 1:
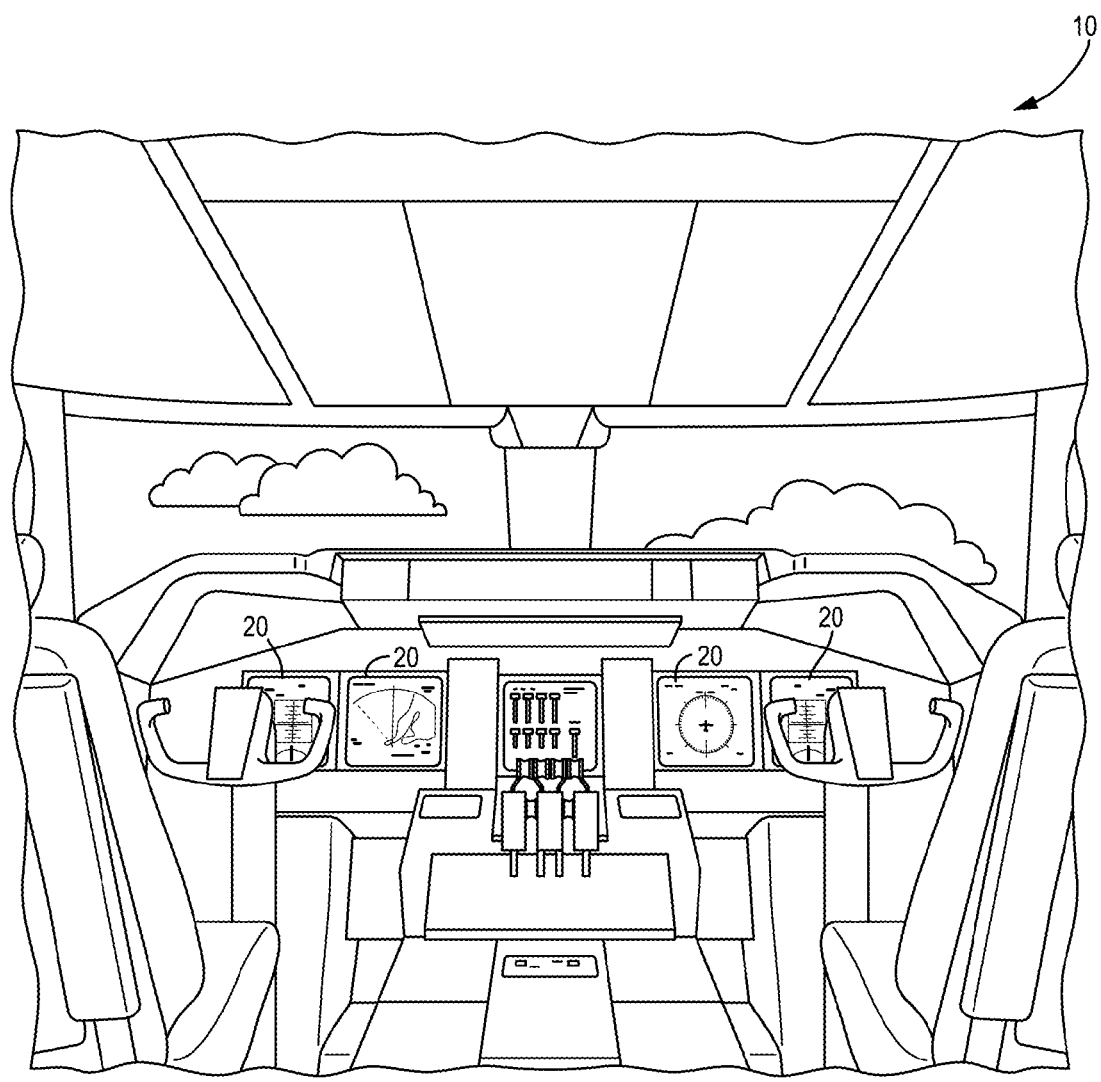
FIG. 1 is an illustration of an aircraft control center, according to an exemplary embodiment.

Before describing in detail the particular improved system and method, it should be observed that the invention includes, but is not limited to a novel structural combination of conventional data/signal processing components and communications circuits, and not in the particular detailed configurations thereof. Accordingly, the structure, methods, functions, control and arrangement of conventional components software, and circuits have, for the most part, been illustrated in the drawings by readily understandable block representations and schematic diagrams, in order not to obscure the disclosure with structural details which will be readily apparent to those skilled in the art, having the benefit of the description herein. Further, the invention is not limited to the particular embodiments depicted in the exemplary diagrams, but should be construed in accordance with the language in the claims.

Referring to FIG. 1, an illustration of an aircraft control center or cockpit 10 is shown, according to one exemplary embodiment. Aircraft control center 10 includes flight displays 20 which are used to increase visual range and to enhance decision-making abilities. In an exemplary embodiment, flight displays 20 may provide an output from a radar system of the aircraft.

Figure 2A:
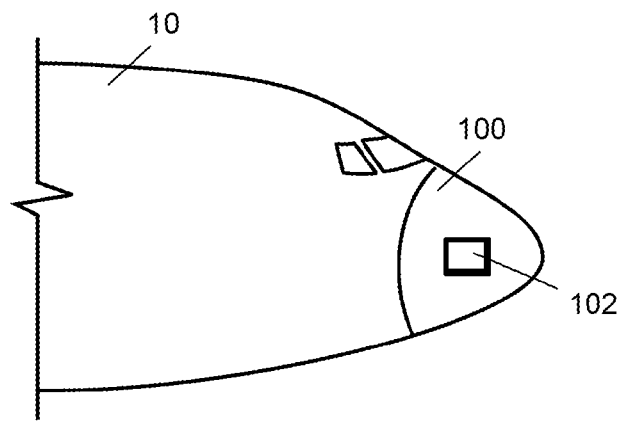
FIG. 2A is an illustration view of the nose of an aircraft including the aircraft control center of FIG. 1, according to an exemplary embodiment.

In FIG. 2A, the front of an aircraft is shown with aircraft control center 10 and nose 100, according to an exemplary embodiment. A radar system 102 is generally located inside nose 100 of the aircraft or inside a cockpit of the aircraft. According to other exemplary embodiments, radar system 102 may be located on the top of the aircraft or on the tail of the aircraft. Radar system 102 may include or be coupled to an antenna system.

Figure 2B:
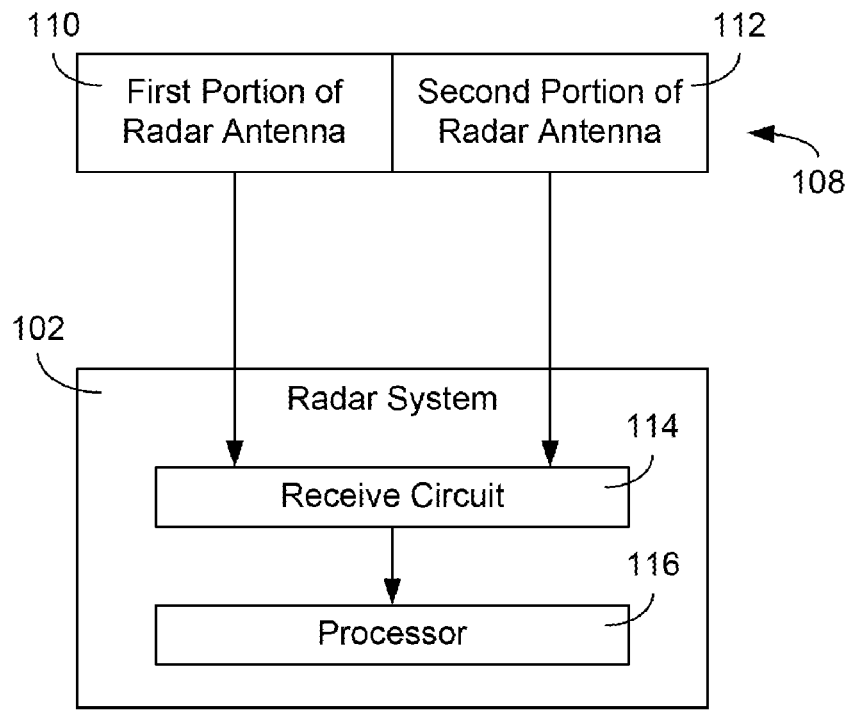
FIG. 2B is a block diagram of a system of receiving and processing radar returns, according to an exemplary embodiment.

In FIG. 2B, radar system 102 is shown in greater detail, according to an exemplary embodiment. Radar system 102 is coupled to an antenna 108 that includes a first portion 110 of the antenna and a second portion 112 of the antenna. Antenna 108 may receive radar returns from a target. In an exemplary embodiment, the radar returns received by radar antenna 108 associated with radar system 102 can be separated into two or more portions 110 and 112. First portion 110 of the returns may relate to data from one area, while second portion 112 of the returns may relate to a second area. For example, second portion 112 may be a bottom half or top half of the antenna. As another example, second portion 112 may be any half of the antenna, or other sized portion of the antenna. Similarly, first portion 110 can be the entire antenna or other sized portion. According to one exemplary embodiment, second portion 112 includes first portion 110. Returns from first portion 110 are associated with a half aperture and returns from second portion 112 are associated with a full aperture.

A high angle resolution process produces angles normal to the angle of separation between portions 110 and 112. According to one embodiment, a full/half separation allows angle estimates to be made. A separation in azimuth allows high resolution in that azimuth direction according to another exemplary embodiment.

According to one exemplary embodiment, a half aperture (or switched aperture) method may be used to sense terrain height. Radar system 102 of the aircraft may operate through radar antenna 108 that toggles between transmitting and receiving on the full aperture and transmitting on the full aperture while receiving on the half aperture. The received signals may be processed to determine a high resolution estimate of a target angle relative to the boresite of the antenna beam. According to an exemplary embodiment, the signals may be processed using a complex conjugate multiplication method to determine the target angle. The method is related to sequential lobing but is executed in the phase domain as opposed to the common amplitude domain.

The method may be used in terrain altitude estimation systems. The method, according to one exemplary embodiment, may be 10 to 15 times more accurate than methods commonly used in monopulse terrain following and terrain avoidance systems.

According to other exemplary embodiments, the first and second portion may be a bottom half, a top half, a left half, a right half, or a whole of the antenna. For example, the first portion may relate to transmitting on any fraction of the full aperture (sum) and the second portion may relate to a half aperture. The present invention is not limited to half aperture techniques and applies any technique that uses fractional apertures. As another example, the first portion may relate to a half aperture and the second portion may relate to a full aperture. As yet another example, both the first portion and second portion may be either a full aperture or half aperture. Any combination of the first portion and second portion that gives an apparent change in the phase center may be used. The first portion is preferably not identical to the second portion. The first portion can intersect, include, or be exclusive of the second portion.

According to various embodiments, combinations of portions can use the reciprocal nature of the radar process of system 102 to exchange fractional aperture selection from transmit to receive operations. According to such an embodiment, the received phase center is effectively moved. While one embodiment shows reception on a full aperture with a mixed transmission of full and half apertures, other sub-aperture selections on reception and transmission are possible.

A first pulse may be provided before sampling the first returns associated with first portion 110, and a second pulse may be provided before sampling the second returns associated with second portion 112. This cycle of pulse and returns can be repeated. The first and second pulses can be full aperture pulses. The full aperture receive data may be used to allow full aperture and half aperture data to be separated.

According to one embodiment, a full aperture coded pulse may be provided for the first data and a half aperture coded pulse may be provided for the second data. The first data and second data received may be associated with full aperture received data, according to an exemplary embodiment. According to another exemplary embodiment, a one third aperture may be used instead of a half aperture. According to yet another exemplary embodiment, a two thirds aperture may be used instead of a half aperture. According to yet other exemplary embodiments, the aperture may be separated in various ways other than a top half and a bottom half or a left half and a right half, and the aperture may be separated unevenly (e.g., not in two halves).

Radar system 102 may include a receive circuit 114 or other circuit configured to receive first data from first portion 110 and second data from second portion 112 and to provide the data to processor 116. In this embodiment, the first data and second data are associated with the first and second portion, respectively, because the first data and second data are derives from returns received by the first and second portion, respectively. Alternatively, the first data and second data can be associated with the first and second portion, respectively, because the first data and second data are derived from returns associated with transmissions from the first and second portions, respectively. According to various exemplary embodiments, processor 116 can be any hardware and/or software processor or processing architecture capable of executing instructions and operating on data related to the radar returns.

According to one exemplary embodiment, the first data and second data may be derived from coded radar pulse transmissions. According to another exemplary embodiment, coding is not required. For example, one system may transmit on the sum and receive on the sum, followed by an independent transmit on the sum and receive on the half aperture, where the pulse sample time does not overlap. Therefore, coding is not required for the transmissions. In "busier" radars, the limited scan time may lead to overlapping of sampling the different portions of the aperture, therefore requiring the use of different coded transmissions.

Figure 2C:
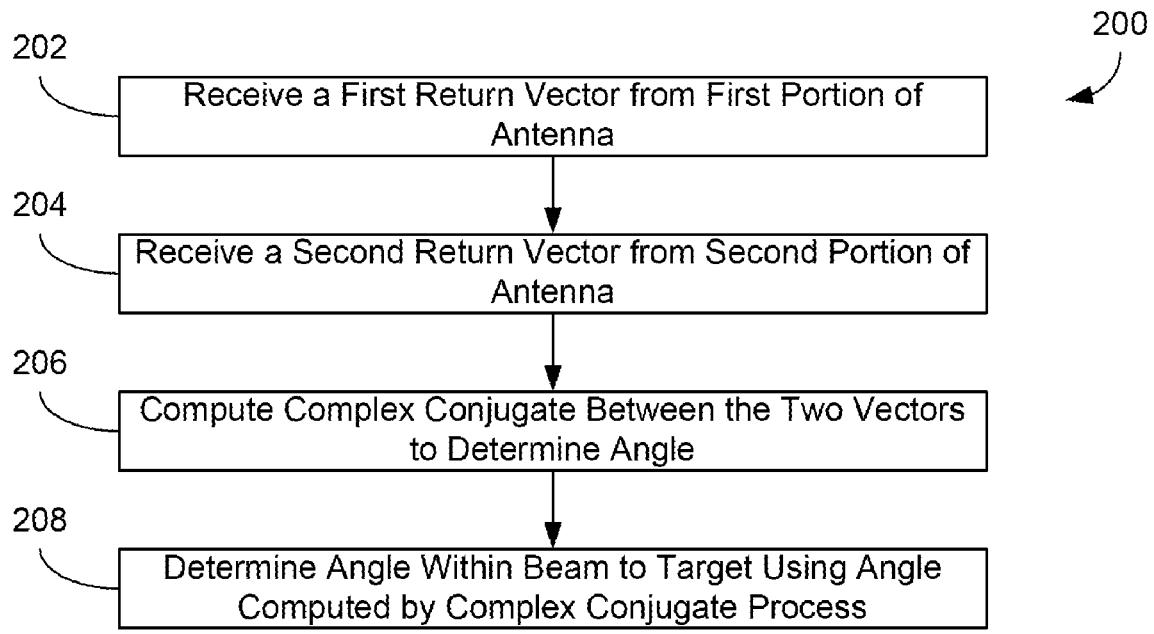
FIG. 2C is a flow diagram of a method of determining an angle within the beam to a target, according to an exemplary embodiment.

The radar system may include a processor 116 or other circuitry to estimate the angle to a target relative to the antenna steering angle (i.e., the angle within the beam to the target), using the returns from the first portion and returns from the second portion. Referring to FIG. 2C, a method 200 for estimating the angle to a target is shown, according to an exemplary embodiment. A first return vector from the target is received from the first portion 110 of the antenna (step 202) and a second return vector from the target is received from the second portion 112 of the antenna (step 204). The first and second phases are processed together by multiplying the first vector by the conjugate of the second vector. The phase of the conjugate product is determined as a result (step 206). The resultant phase of the conjugate multiplication process is used to determine the angle within the beam to the target (step 208). The determined angle may be representative of a phase associated with first portion 110 of the antenna and second portion 112 of the antenna.

According to one exemplary embodiment, a third return vector from the target from first portion 110 of the antenna may be received. Additionally, a fourth return vector from the target from second portion 112 of the antenna may be received. An angle within the beam to the target may be calculated using the first return vector, second return vector, third return vector, and fourth return vector. A third pulse may be provided before sampling the third returns, and a fourth pulse may be provided before sampling the fourth returns.

Referring to FIG. 3, a pulse beam 300 illustrating a system of sequential lobing with a half-aperture antenna is shown, according to an exemplary embodiment. Pulse beam 300 illustrates a four pulse high resolution pattern. As discussed above, although half-aperture is described, other sub-aperture sizes are possible and such sizes can be on the receive or transmit side. According to other exemplary embodiments, a three pulse pattern may be used, or other configurations may be used. The system "shuts off" half of the aperture half of the time. The system may transmit on the sum (e.g., full aperture) and receive on the sum (pulse 302, e.g., portion 110). The system may then transmit on the sum and receive on one-half of the aperture (pulse 304, e.g., portion 112). The next pulse of the system may transmit on the sum and receive on the sum (pulse 306, e.g., portion 110), followed by transmitting on the sum and receiving on one-half of the aperture (pulse 308, e.g., portion 112).

The one-half of the aperture being received on in pulses 304 and 308 are the same halves, according to an exemplary embodiment. An upper half, lower half, left half, or right half of the aperture may be chosen.

During the various pulses 302-308, the phase center of the antenna changes. The phase center data may be processed and used to produce phase steering information for the radar system. Referring now to FIG. 4, an illustration of the difference in phase center between a full aperture and half aperture is shown. The distance 408 from target 402 to the center of full aperture 404 is different than the distance 410 from target 402 to the phase center of half aperture 406 (the upper aperture). The distance difference produces a phase difference that may be measured to estimate the angle to the target relative to the antenna surface.

Distance 412, shown added to distance 410, represents the difference in distances 408, 410. Distance 412 is a vector that represents the phase difference used to estimate the angle to the target relative to the antenna surface. Method 500 of FIG. 5 illustrates a method of determining the angle.

According to one preferred exemplary embodiment, phase processing may be used to calculate the angle to a target relative to the antenna pointing angle or beam angle. The phase processing uses the first data and the second data obtained by sequential lobing in a half-aperture antenna radar system (e.g., radar system 102). By mathematically combining individual sub-aperture responses with complex conjugate multiplications instead of detecting individual sub-aperture responses, the accuracies that result exceed the accuracies produced by a monopulse system. According to an exemplary embodiment, the system may provide angle estimates with standard deviations less than the beamwidth divided by fifty instead of the beamwidth divided by ten for monopulse systems. According to another exemplary embodiment, the standard deviations may be in the range of one hundredth to one hundred fortieth of a real beamwidth. The terrain or target angle estimation performed with better accuracy may allow the radar system to be defined with both good detection characteristics and low false alarm characteristics.

In sequential lobing, two antennas that are close to the same place may be used, going back and forth between the two antennas. An amplitude signature or phase signature that varies between the two halves of the antennas may be used to obtain data about target position for detected targets (e.g., an object such as other aircraft, terrain, towers, etc.). Sequential lobing generally does not use phase comparisons with moving targets due to Doppler-induced phase changes that contaminate the phase center measurement. However, using a complex conjugate multiply method allows the Doppler-induced phase changes to be removed by cancellation. Therefore, a change in phase center between a sum beam and a half beam may be determined.

Figure 5:
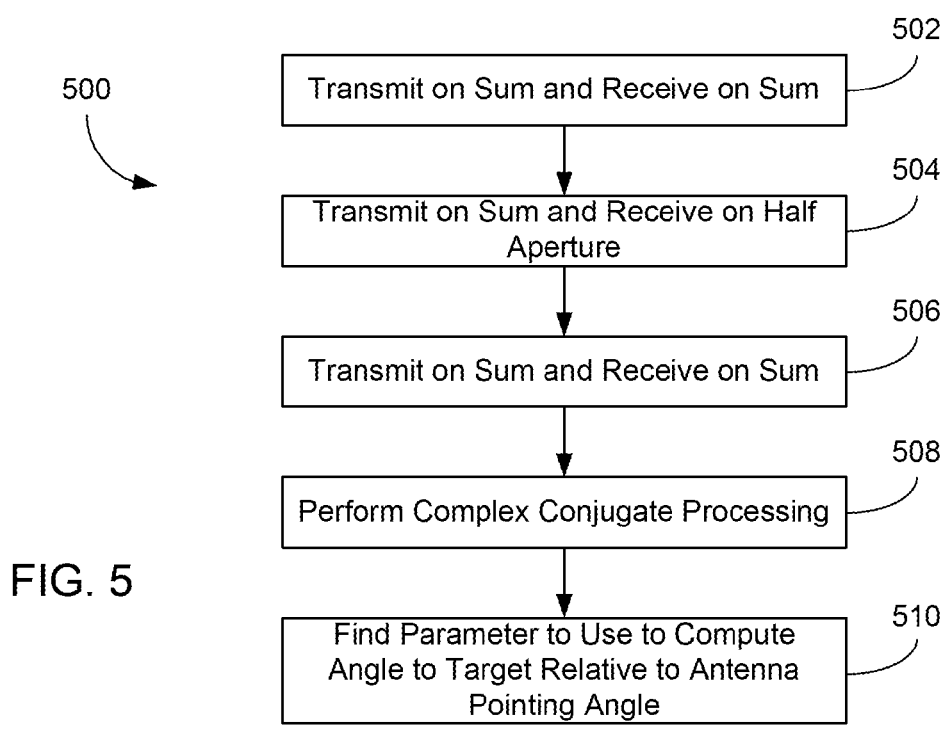
FIG. 5 is a flow diagram of a method of finding a parameter to use to compute a target angle, according to an exemplary embodiment using at least three pulses.

Referring now to FIG. 5, a flow diagram of a method 500 of finding a parameter to use to compute a target angle is shown, according to an exemplary embodiment.

The first pulse is received (step 502). The system may transmit on the sum beam and receive on the sum beam. A power vector $V_S$ (for the sum beam) and an angle $\phi$ is received. The sampled return from the first pulse may be represented by the equation (in polar coordinates): P1= $(V_s, \angle(\phi))$. The nomenclature represents a voltage signal associated with the energy of the received return. The voltage signal is expressed as a vector and represents power associated with the radar return. $V_S$ is the magnitude of the vector while $\phi$ is the argument or phase of the vector.

The second pulse is received (step 504). The system may transmit on the sum beam and receive on the half aperture. A half aperture power vector $V_H$ is received (for the half-aperture or upper beam). Also received is the same arbitrary angle $\phi$ of step 502 plus a change in the phase due to movements between the pulses (represented by the variable "PhiDoppler") and a change in the phase due to the shift in the phase center (represented by the variable "PhiOffset"). The change in phase of PhiDoppler is caused by relative movement of the target between the pulses. The sampled return from the second pulse may be represented by the equation:

$P2=(V_H, \angle(\phi+\text{PhiDoppler}+\text{PhiOffset}))$.

The PhiOffset is the phase difference caused by the distance 412 in FIG. 4.

The third pulse is received (step 506). The system may transmit on the sum beam and receive on the sum beam. A power vector $V_S$ is received. The power vector received is equal to the power vector received in step 502. The Doppler continues to rotate through because phase changes are being accumulated from the Doppler. For the third pulse, the change in phase due to the Doppler may be doubled compared to the change in the second pulse of step 504. Therefore, the sampled return from the third pulse may be represented by the equation: $P3=(V_S, \angle(\phi+2*\text{PhiDoppler}))$.

Complex conjugate processing may be performed (step 508). The above description is for a three pulse system. Method 500 and associated system 102 can be configured for systems that use from 2 pulses to N pulses where N is a large number.

Mathematics for a three pulse angle within beam with Doppler removal system is described below (e.g., PhiDoppler is cancelled). Three continuous pulses may be used in the estimate process out of any length pulse stream. For example, three pulses from the four pulses discussed above can be chosen. A value $P_A$ may be found by multiplying P1 times the conjugate of P2 (the first and second pulse):

$P_A=P1*\text{conj}(P2)=(|V_S|*|V_H|, \angle(-\text{PhiDoppler}-\text{PhiOffset}))$.

A value $P_B$ may be found by multiplying P2 times the conjugate of P3 (the second and third pulse): $P_B=P2*\text{conj}(P3)=(|V_H|*|V_S|, \angle(-\text{PhiDoppler}+\text{PhiOffset}))$.

A value $P_C$ may be found by multiplying $P_A$ times the conjugate of $P_B$:

$P_C=P_A*\text{conj}(P_B)=(|V_H^2|*|V_S^2|, \angle(2*\text{PhiOffset}))$.

In the previous equation, for the angle component of $P_C$, the values for $\phi$ and PhiDoppler cancel out, and the only variable of the angle component remaining is two times the phase center shift. The variable PhiOffset may be solved for using the equation $$PhiOffset = \left(\frac{1}{2} * \arctan(P_C)\right).$$

The PhiOffset value of the angle component may be used as a parameter for computing the angle to target relative to the antenna pointing angle (step 510). The phase shift is a direct function of the steering angle inside the real beam. For example, for a 12 inch antenna operated at 9.3 GHz, in the value of the phase of $P_C$, 10 degrees of phase shift represents one degree of target angle change. In other words, for every degree by which the phase change is off, the beam center is off by $1/10^{th}$ of a degree (e.g., $1/10^{th}$ of a degree from normal to the surface of the antenna). This may be represented by the equation: PhiBeam=PhiOffset÷10, where PhiBeam is simply the target angle change.

Still referring to step 510, the output of the set of conjugate multiplications of step 510 produces a scaled version of the angle from the antenna pointing angle (the angle references to a vector normal to the surface of the antenna flat plate). Once scaling (via multiplication) is performed, the antenna pointing angle may be added to produce the angle to the target. If the antenna pointing angle is referenced to the local horizon (e.g., ground), the final angular value provided by method 500 is the angle within the beam to the target referenced to the local horizon.

The resultant vector of the multiplications of step 508 is in a full rectangular form, which allows the vector to be in a usable form to allow coherent integration with similar vectors. Coherent integration is the addition of multiple vector estimates to produce a better final estimate. In typical monopulse systems, averaging is done incoherently, with the multiple angle arguments of a vector that represents target phrase being averaged. The averaging process produces a best-case reduction in the standard deviation of the resulting angle by the square root of the number of samples averaged. One advantage of the present method is that coherent integration is possible for the estimated angles instead which produces a best case reduction in the standard deviation of the estimated angle of N, where N is the number of samples coherently averaged together. Coherent integration provides an advantage is that the angle may be improved by the number of samples integrated. The removal of the Doppler induced phase allows the coherent integration to be possible. For example, for a pulse stream of 30 pulses in a three-pulse system, 10 independent vectors are formed using the equation for $P_C$. Errors caused by noise are therefore reduced by a factor of up to 10 compared to a single estimate.

Coherent integration may additionally allow for glint (e.g., angle noise) reduction. For complex targets, larger returns from the targets have smaller multi-target cancellations and less glint. Radar can cause transmitter frequency changes to produce radar return samples that are relatively independent. Selecting the largest returns while changing transmitter frequencies allows targets with the smallest target glint to be selected. Coherently averaging the rectangular power squared terms that are a product of the half-aperture (or other) process reduces the influence of returns that are small and likely to have substantial glint. See, Skolnik, Merrill I. Radar Handbook (McGraw Hill Book Company, New York, 1990, $2^{nd}$ edition, Pgs. 18.37-18.57).

A Doppler estimate may be calculated via vector multiplication using the equations for $P_A$ and $P_B$: $P_D = P_A \times P_B = (|V_H^2|*|V_S^2| \angle (2*\text{PhiDoppler}))$. The value of the phase of $P_D$ along with the time between pulses may be used to estimate the local Doppler after the $P_D$ phase is divided by two: Doppler=(phase($P_D$)/2*(2*Å*PRT)), where "PRT" is the pulse repetition time. A two pulse version of method 500 of FIG. 5 requires a Doppler estimate to be available to produce pointing angle estimates within the radar beam, as the Doppler produces an angle error. The Doppler estimate may be obtained from either the radar of the aircraft or from other aircraft equipment. The Doppler estimate may be determined in a variety of ways (e.g., using data regarding the velocity of the aircraft, heading of the aircraft, scan angle of the aircraft, from a system such as a global positioning system (GPS) or otherwise, etc.). The equation for $P_D$ represents one method of generating a Doppler estimate from the radar in a method compatible with the less than full aperture process.

Figure 6:
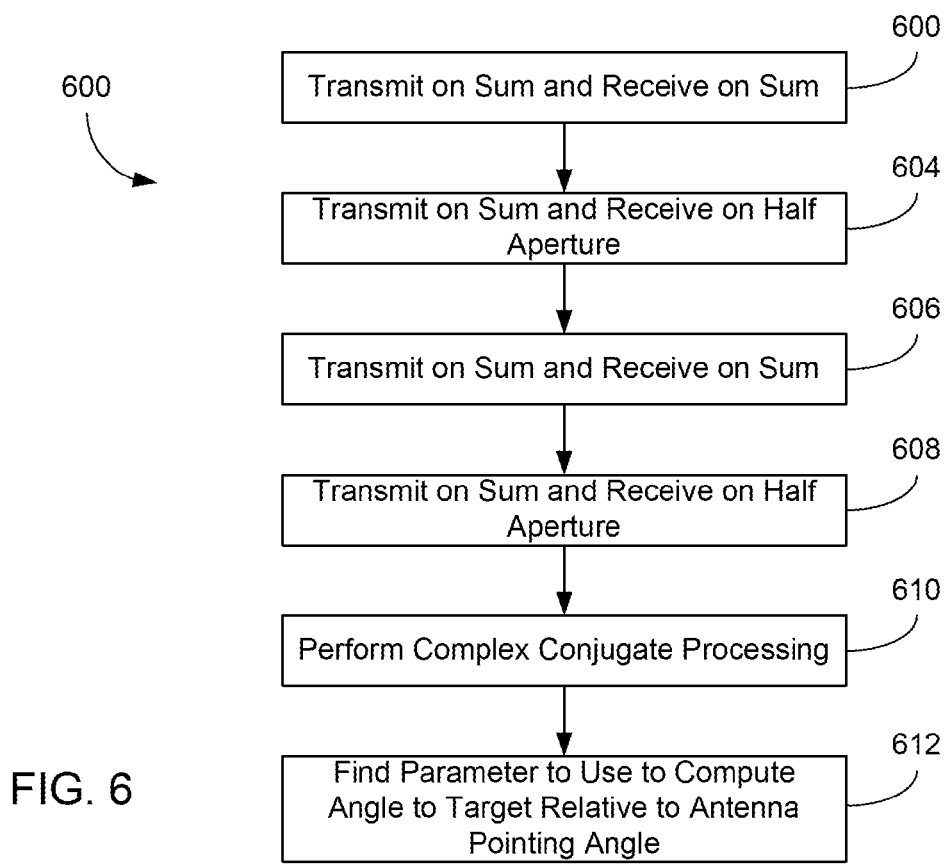
FIG. 6 is a flow diagram of a method of finding a parameter to use to compute a target angle, according to another exemplary embodiment using at least four pulses.

Referring to FIG. 6, a flow diagram of a method 600 of finding a parameter to use to compute a target angle is shown, according to another exemplary embodiment. Method 600 is a four pulse pattern process instead of the three pulse patterns process of method 500 of FIG. 5. The system may transmit on the sum beam and receive on the sum beam (step 602), followed by transmitting on the sum beam and receiving on the half aperture (step 604), followed by transmitting on the sum beam and receiving on the sum beam (step 606) and followed by transmitting on the sum beam and receiving on the half sum beam (step 608). In steps 602-608, equations may be formed as described in steps 502-506 of method 500 of FIG. 5. Using the equations, complex conjugate processing may be performed (step 610) as described in step 508 of method 500 of FIG. 5, and a parameter to use to compute the angle to target relative to the antenna pointing angle is found (step 612), as described in step 510 of method 500 of FIG. 5.

The fourth pulse may be similar to the second pulse, except the Doppler continues to rotate. For the fourth pulse, the change in phase due to the Doppler may be tripled compared to the change in the second pulse of step 504. The sampled return from the fourth pulse may be represented by the equation:

P4=($V_H, \angle(\phi+3*\text{PhiDoppler}+\text{PhiOffset}))$. The four pulses of steps 602-608 may be closely spaced such that high correlation between the pulse returns is maintained.

According to one exemplary embodiment, in the methods 500 and 600 of FIGS. 5-6, the transmitting function may be toggled between a half aperture (or other fraction) and full aperture instead of the receive function. For example, in method 500 of FIG. 5, the system may transmit on the sum beam (step 502), followed by a transmit on the half aperture (step 504), and a transmit on the sum beam (step 506), while the system receives on the sum beam in all three pulses. In accordance with another exemplary alternative embodiment, data associated with the pulses can be sets of data associated with pulses.

Figure 7:
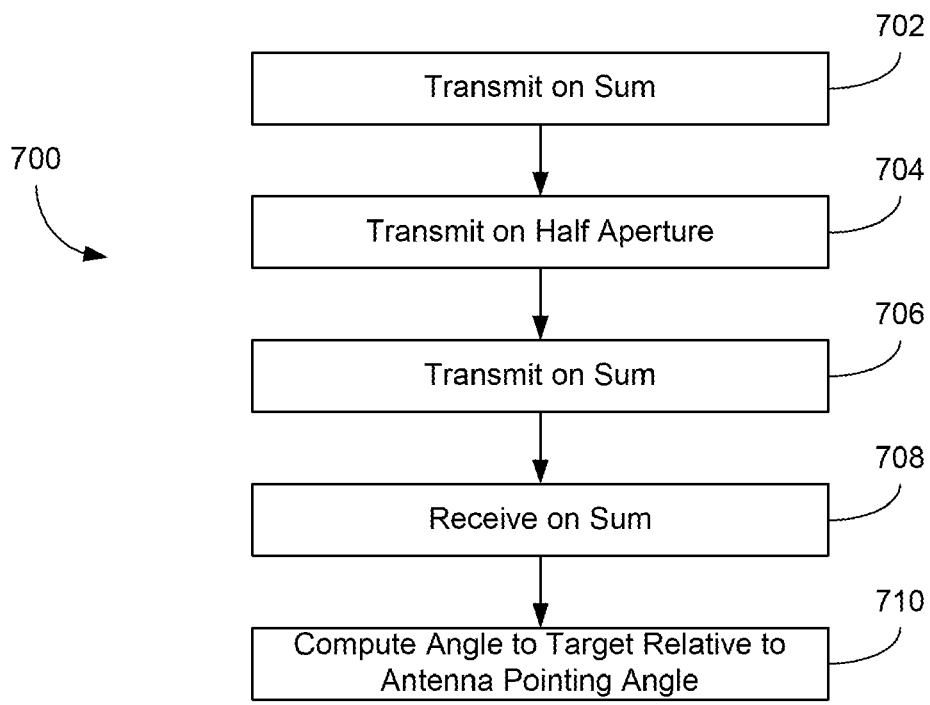
FIG. 7 is a flow diagram of a method of applying a three pulse pattern to a radar, according to an exemplary embodiment.

Referring to FIG. 7, a flow diagram of a method 700 of applying a three pulse pattern to a radar (e.g., a weather radar such as a MultiScan® radar as manufactured by Rockwell Collins, Inc.) is shown, according to an exemplary embodiment. The system may transmit on the sum (step 702), transmit on the half aperture (step 704), and transmit on the sum (step 706). The three pulse lengths may be 25 microseconds long, according to one exemplary embodiment. The system may receive on the sum (step 708). The receive information is convolved with the three pulse codes in parallel to recover the three individual responses to the three pulses. The antenna pointing is approximately the same for all three pulses, and the radar target will not decorrelate over the time period (e.g., 75 microseconds) across the transmit set. The target angle may be calculated using the data received (step 710). The calculations may be similar to those of steps 510 and 512 of method 500 of FIG. 5.

Figure 8:
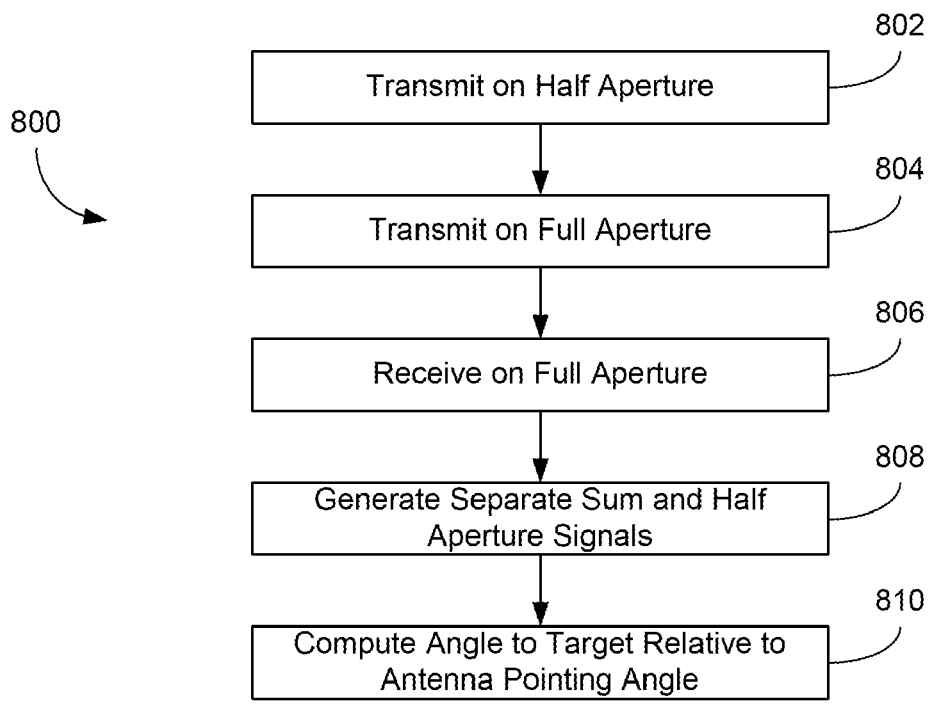
FIG. 8 is a flow diagram of a method of half aperture usage in a radar, according to an exemplary embodiment.

Referring to FIG. 8, a flow diagram of a method 800 of half aperture usage in a radar is illustrated, according to an exemplary embodiment. In method 800, a two pulse pattern may be used instead of the three pulse pattern of method 700 of FIG. 7. Method 800 may be used in cases where the Doppler is known and only two pulses are needed to calculate the angle to target. The system may transmit on the sum (step 802) and transmit on the half aperture (step 804) before receiving on the sum (step 806).

For each transmission and reception (e.g., the two pulses in method 800), there is a phase code or frequency code. The codes or frequencies can be chosen to produce low cross-correlations between codes or frequencies. If the time between the two transmissions is short, the cross correlation between the codes is low. Therefore, separate sum and half aperture responses may be generated (step 808) from the response of step 806. The received response of step 806 may be processed with two separate codes allowing responses from the half aperture and full aperture to be distinguished and separated. The analysis as described in FIG. 8 may then be used to compute an angle to target relative to the antenna pointing angle (step 810). The calculations may be similar to those of steps 510 and 512 of method 500 of FIG. 5.

The use of a target phase in a radar process allows the ability to avoid a lengthy filtering process that is used to produce estimates of power return between antenna sweeps taken at different elevations when target elevation is used to separate targets, such as weather from ground. The two pulses may be used to make an angle measurement in flight as the pulses are correlated.

The less than full aperture method as disclosed may be used for the detection of a plurality of targets. Land, terrain, other aircraft, military targets, towers, etc., may be objects that may be detected. For example, the less than full aperture method may be used to detect the top of radio towers. As another example, the less than full aperture method may be used to detect the top of precipitation as well.

Figure 9:
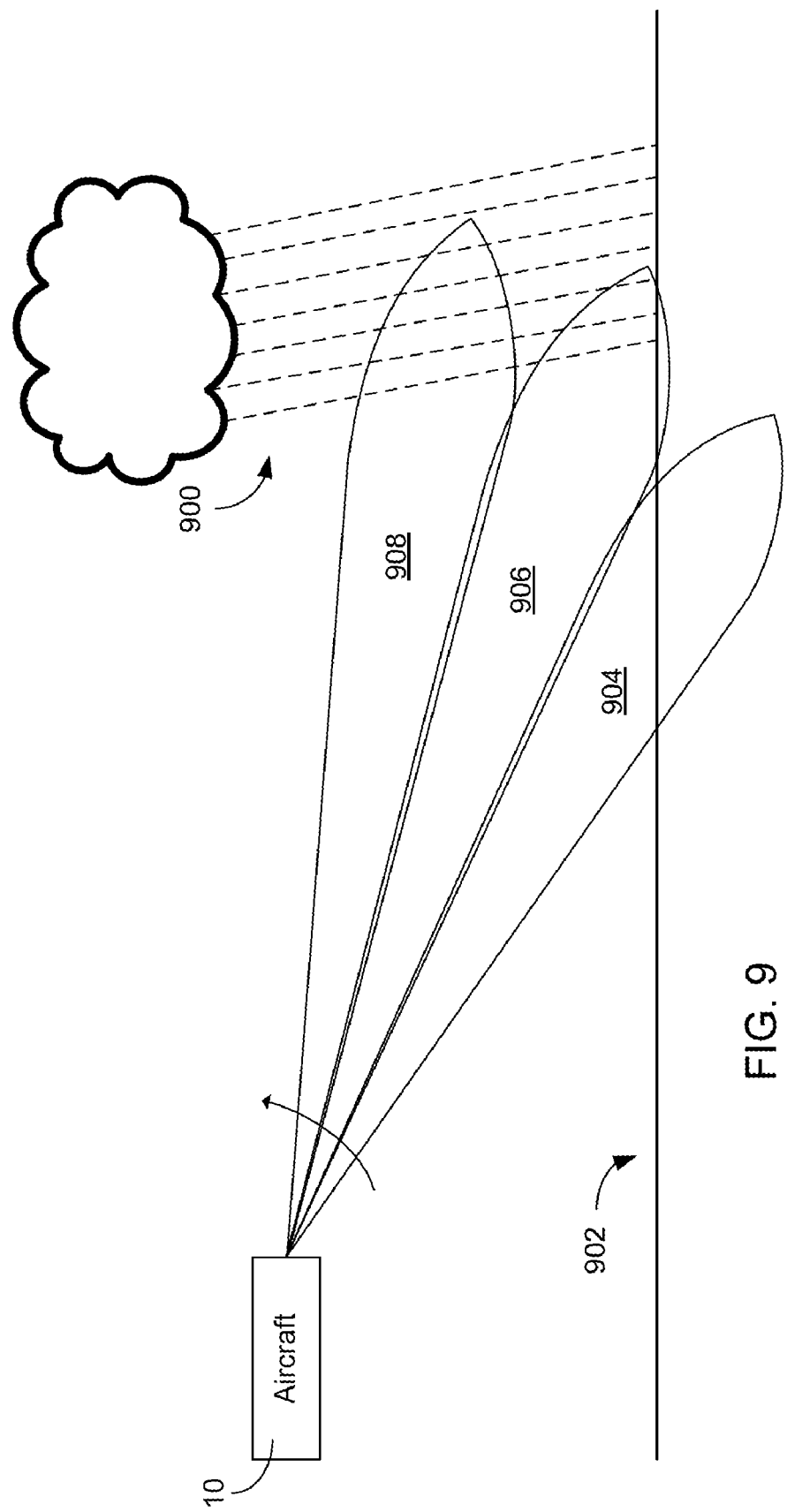
FIG. 9 is a view of an aircraft mounted radar vertically sweeping across ground and weather conditions, according to an exemplary embodiment.

Referring now to FIG. 9, an illustration of an aircraft 10 and vertical sweeping is shown, according to an exemplary embodiment. In the embodiment of FIG. 9, weather conditions 900 is illustrated as precipitation and terrain 902 is shown. Vertical sweeping may be used in conjunction with coherent integration. An antenna may vertically sweep (e.g., sweep from low to high) and the conjugate products (as determined using method 500 of FIG. 5) across the beam may be averaged. The averaging may be done either with or without focusing. Without focusing, the complex conjugate products are added. With focusing, the complex conjugate products are compensated by phase change over the beam by multiplying each complex conjugate by a local unit vector representing the phase of the antenna conjugate process at the approximate antenna sample angles. Focusing is discussed in more detail below with reference to FIGS. 12-14.

According to one exemplary embodiment, a small number of three pulse sets (e.g., a "block") may have a common transmit frequency, followed by changing the transmit frequency (i.e., by more than a value of 1 over the pulse length) and sampling a next block of returns. The terms produced by the conjugate process may be coherently summed.

Aircraft 10 may sweep vertically in a range from area 904 to area 908. As aircraft 10 vertically sweeps across area 904, the radar detects ground objects. As aircraft 10 vertically sweeps across area 904 into area 906, weather targets may begin to be detected. Detected ground targets occupy high gain locations in the beam compared to the weather targets, which occupy very low gain locations. Angle data from these areas 904, 906 is generally dominated by the phase response from ground targets. As aircraft 10 vertically sweeps across area 906 into area 908, ground targets begin to drop in return levels while weather targets produce larger returns. Therefore, generally data from area 908 is "contaminated" by weather targets and is generally not useful for ground target estimation.

The radar system of aircraft 10 may include a processor or other processing devices and/or software that is configured to detect when weather conditions are picked up on the radar returns. Further, the radar system may include the same to remove or discard radar returns affected by the weather conditions. The radar system may then use valid radar returns to determine the angle within the beam to the terrain using the systems and methods as described in the disclosure.

According to one exemplary embodiment, lower one-half beam data may be used to reject weather induced errors that may be the result of vertically sweeping from area 904 to area 908. Data may be integrated together over the lower half of the beam response from ground. The point at which data is no longer used may be determined by an angle constraint (e.g., one-half beam width from where "good" data was last seen by the radar). Alternatively, a maximum power point may be determined and used determine when no longer to use the data.

Figure 10:
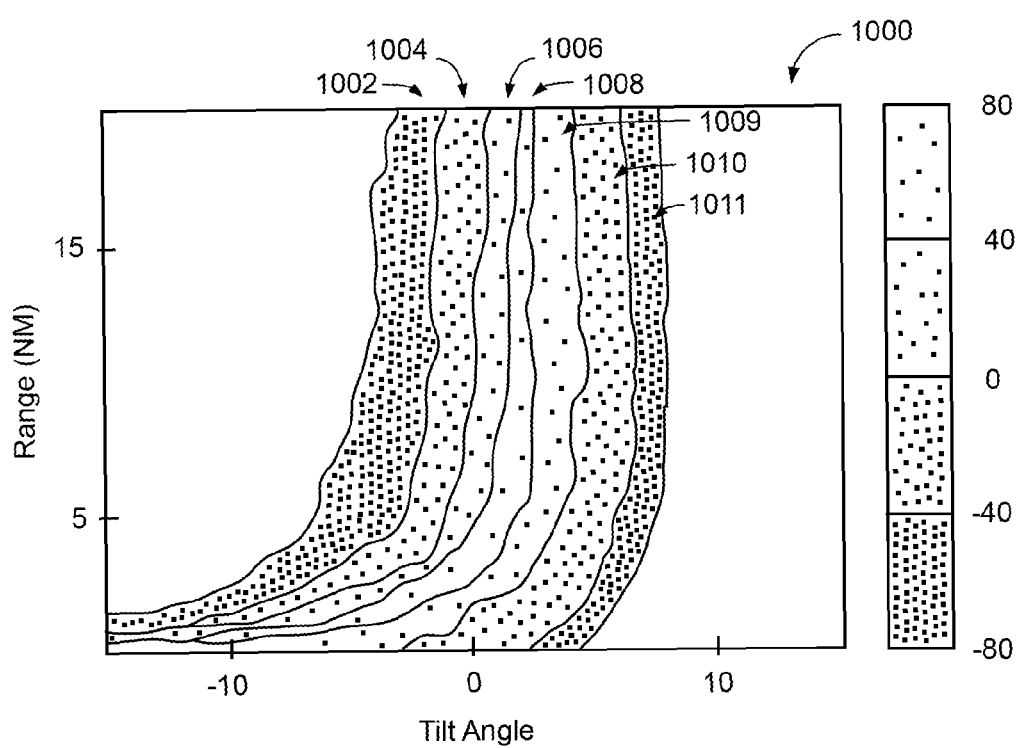
FIG. 10 is a graph of radar return power from the airplane of FIG. 9, according to an exemplary embodiment.

Referring now to FIG. 10, a graph 1000 illustrating vertical sweeping is shown, according to an exemplary embodiment. In FIG. 10, there is no weather interference. The horizontal axis represents tilt angle of the antenna and the vertical axis represents the range. Ground is represented in areas 1002-1011 while there are no returns in the other areas of graph 1000. Areas 1002-1011 are shown broken into sections based on the phase output from the complex conjugate method given the tilt angle and range of the antenna. The difference between areas 1002-1011 may be representative of the phase shift as the antenna tilt angle changes.

Figure 11:
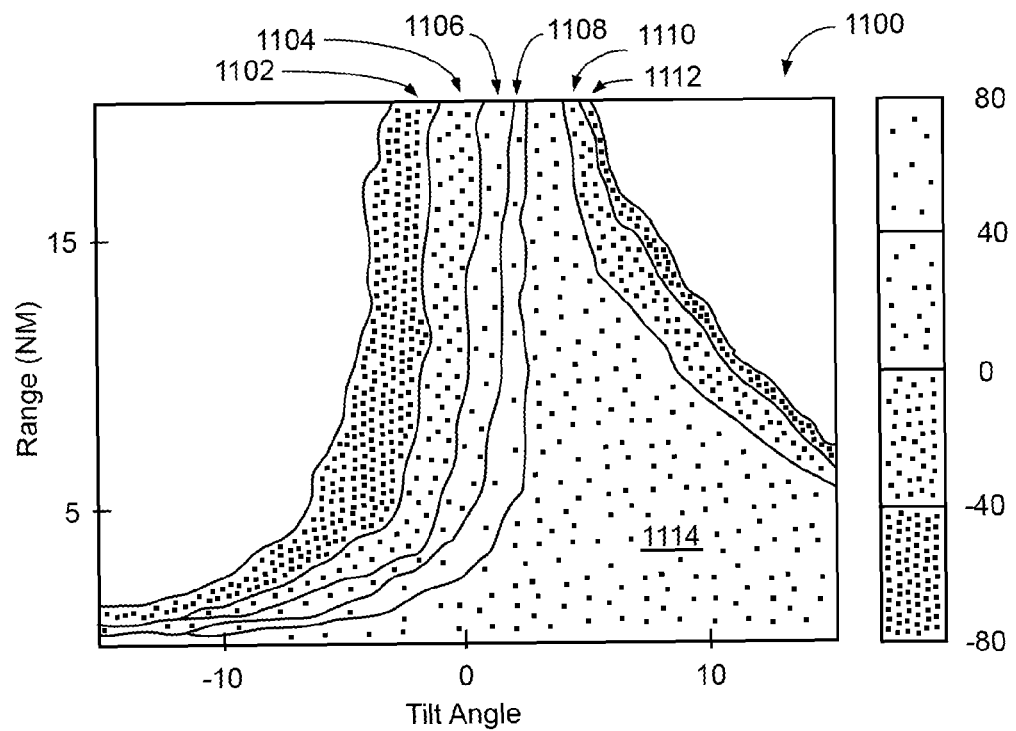
FIG. 11 is a graph of processes phase generated from radar return from the airplane of FIG. 9, including detected weather conditions, according to an exemplary embodiment.

Referring also to FIG. 11, graph 1100 illustrates the addition of weather interference (e.g., rain). Compared to graph 1000, graph 1100 illustrates additional returns (in areas 1110-1114) which are picked up due to the presence of weather conditions, in addition to areas 1102-1108. The maximum height where precipitation is detected is in area 1112 (e.g., where the values range from −40 to −80). In the embodiment of FIG. 10, power levels drop as the antenna is scanned above the ground. However, in FIG. 11, with the presence of precipitation, the power returns from the precipitation override the fading ground returns as the antenna is scanned past the ground. As described and illustrated in FIG. 9, radar returns may be rejected out when the antenna is pointed in area 908 of FIG. 9 (e.g., the returns when the tilt angle is greater than 0 as shown in FIG. 11 are rejected). Radar returns from weather will generally fall from some altitude to the surface of Earth.

According to one exemplary embodiment, the radar may be optimized to detect obstacles such as towers in addition to terrain or ground and weather conditions such as rain. Processing for determining obstacles may be separated from processing for determining terrain. Weather may be separated from terrain as described in FIG. 9, while using shorter transmitter pulses may allow for obstacles to stand out and be separated from weather conditions.

According to one exemplary embodiment, system 102 may detect errors as a self-monitoring system. Response data may be used for self-monitoring. The known amplitude characteristic difference between a full aperture and half aperture may be used to confirm the operation of the radar. Additionally, a constant phase slope as illustrated in graphs 1000, 1100 of FIGS. 10-11 may be used to monitor operations. System 102 may detect a change in power in the data.

According to various exemplary embodiments, the process flows of FIGS. 2C, 5, 6, 7, and 8 may be embodied as hardware and/or software. In exemplary embodiments where the processes are embodied as software, the processes may be executed as computer code on any processing or hardware architecture or in any radar system.

FIG. 12 shows a first graph of elevation being swept on the Y axis versus a beam gain on the X axis and a second graph showing elevation being swept on the Y axis versus phase output from the conjugate process on the X axis. FIG. 12 shows a relatively linear relationship between the complex conjugate phase output and the elevation angle.

Figure 13:
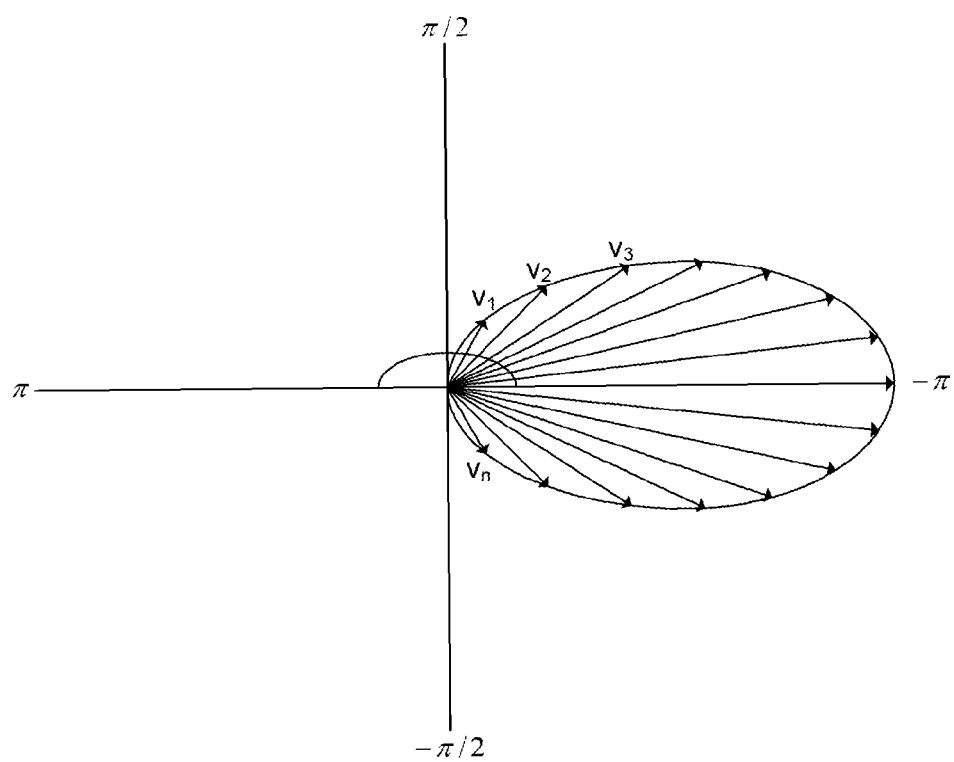
FIG. 13 is a graph showing the response from vertically sampled beams in a polar coordinate arrangement for the graphs illustrated in FIG. 12.
Figure 14:
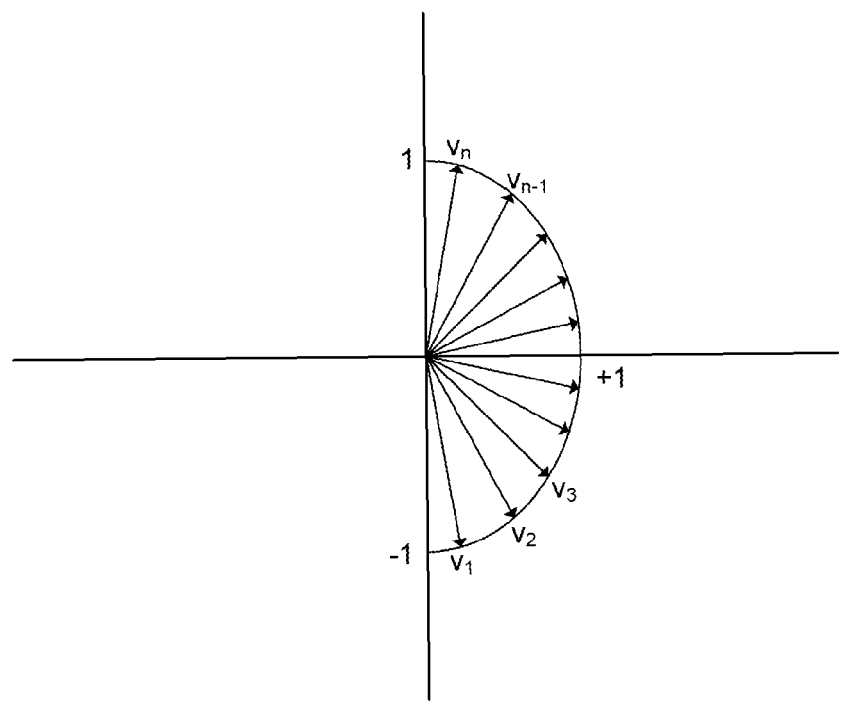
FIG. 14 is a graph showing a focusing vector for the exemplary returns illustrated in FIG. 12.

FIG. 13 shows individual vectors $V_1$ through $V_n$ representing responses from vertically sampled beams in a polar coordinate arrangement. The vertically sampled beams can correspond to the beam set shown in FIG. 9. With reference to FIG. 14, a focusing vector is shown in polar coordinates.

System 102 can be optimized by using a focusing vector. The fractional aperture multiple conjugate process produces a vector that represents the angle within the beam for a given sample set as given by the equation below:

$$\phi_{InBeam} = K1 \cdot \arg(Vc)$$

where Vc is the output of the three pulse conjugate process, K1 is a factor relating the output of the conjugate process with the angle within the beam, and the term "arg(Vc)" refers to the phase of the vector Vc is in polar form.

The angle to the target is the beam elevation plus the angle within the beam as given by the equation below:

$$\phi_{Tgt} = \phi_{Elevation} + \phi_{InBeam}$$

If n samples have been taken, the samples may be averaged together as given by the equation below. If the beam is slewing vertically during the sample time, the local antenna elevation angle is included.

$$\phi_{TgtAvg} = \frac{1}{n} \cdot \left[ \sum_{m=1}^{n} \phi_{Elevation_n} + \phi_{InBeam_n} \right]$$

The equation can be organized with a fixed elevation angle, e.g., the center angle of the sample set, and an offset to that angle to represent that set of elevation angles as given by the equation below:

$$\phi_{TgtAvg} = \phi_{ElevCenterOfSamples} + \frac{1}{n} \cdot \left[ \sum_{m=1}^{n} \phi_{ElevationOffsetFromCenter_n} + \phi_{InBeam_n} \right]$$

The phase arguments are averaged, that is the individual samples are incoherently averaged to gain a better estimate of the switched antenna/conjugate processed angle which gives a better estimate of the angle to the target. If coherent processes for the inbeam phase estimate are used, the coherently averaged in beam phase can be generally represented by the following equation:

$$\phi_{CoherentlyAvgInBeam} = \arg\left( \sum_{m=1}^{n} Vc_n \right)$$

where Vc is a rectangular complex output from the switched antenna/conjugate process. This compares to the incoherently filtered type of process discussed above and is represented by the following equation:

$$\phi_{IncoherentlyAvgInBeam} = \frac{1}{n} \cdot \left[ \sum_{m=1}^{n} (\arg(Vc)) \right]$$

If the coherently average samples are achieved, better estimates can be achieved than from an incoherently filtered system. With several caveats, the standard deviation of a set of vectors coherently averaged is reduced by the number of elements averaged together as opposed to a square root improvement in standard deviation which incoherent integration (straight averaging) affords. Accordingly, an estimate of target angle can be coherently built according to the equation below (first separating the summations).

$$\phi_{TgtAvg} = \phi_{ElevCenterOfSamples} + \frac{1}{n} \cdot \sum_{m=1}^{n} \phi_{ElevationOffsetFromCenter_n} + \arg\left( \sum_{m=1}^{n} Vc_n \right)$$

According to another embodiment, a goal of gaining reductions in the standard deviation of the target estimate by about n (number of samples) can be achieved. The goal can be achieved by addressing the problem that the Vc vector moves over about +90 to −90 degrees while the target is in view of the beam. Adding samples associated with the extremes of +90 and −90 degrees does not produce the constructive addition, but instead a destructive addition that tends to cancel. The high signal-to-noise movement of the Vc vector over the scan with the elevation offset from the center of the set of samples for each sample can be described by the equation below. K1 is the beam scaling constant introduced in the equation set forth above.

$$\phi_{VcCausedByElevMovement_n} = K \cdot \phi_{ElevOffsetFromCenter_n}$$

With the local movement of the Vc vector, a unit vector with the same movement in preparation to aligning all Vc vectors can be produced according to the following equation:

$$\mu_n = \exp(K2 \cdot j \cdot \pi \cdot \phi_{VcCausedByElevMovement_n})$$

(exp(x) is an epsilon to the x power function)

By choosing the correct sign for the constant of proportionality, each unit vector $\mu_n$ may have the opposite local movement of the local Vc vector. This allows all the Vc vectors to be aligned according to the following equation:

$$\phi_{TgtAvg} = \phi_{ElevCenterOfSamples} + \arg\left( \sum_{m=1}^{n} \mu_n \cdot Vc_n \right)$$

Preferably, the Vc vectors are focused to be in alignment and coherently integrated.

While the detailed drawings, specific examples, detailed algorithms, and particular configurations given describe preferred and exemplary embodiments, they serve the purpose of illustration only. The inventions disclosed are not limited to the specific forms shown. For example, the methods may be performed in any of a variety of sequence of steps or according to any of a variety of mathematical formulas. The hardware and software configurations shown and described may differ depending on the chosen performance characteristics and physical characteristics of the radar and processing devices. For example, the type of system components and their interconnections may differ. The systems and methods depicted and described are not limited to the precise details and conditions disclosed. The flow charts show preferred exemplary operations only. The specific data types and operations are shown in a non-limiting fashion. For example, the scope of the claims are intended to cover any technique that uses a selectable fractional aperture unless literally delineated from the claims. Furthermore, other substitutions, modifications, changes, and omissions may be made in the design, operating conditions, and arrangement of the exemplary embodiments without departing from the scope of the invention as expressed in the appended claims.

What is claimed is:

1. A method of determining an angle within a beam to terrain for a terrain avoidance system, the method comprising:
   receiving first data associated with first returns associated with a first portion of an antenna;
   receiving second data associated with second returns associated with a second portion of the antenna, wherein the first portion is different than, intersects, or includes the second portion, and
   determining the angle to the terrain using the first and second data.

2. The method of claim 1, further comprising receiving third data associated with third returns associated with the first portion, where a Doppler component associated with at least one of the first, second, and third data is cancelled in the determining step.

3. The method of claim 1 wherein returns associated with the second portion are associated with a half aperture and the returns associated with the first portion are associated with a full aperture.

4. The method of claim 1 further comprising determining a first vector associated with the target using the first data and a second vector associated with the target using the second data.

5. The method of claim 3 wherein the complex conjugate between the first vector, and the second vector is used to determine the angle within the beam to the terrain.

6. The method of claim 1 further comprising:
   providing a first pulse before sampling the first returns; and
   providing a second pulse before sampling the second returns.

7. The method of claim 6 further comprising:
providing a third pulse before sampling the third returns; and
providing a fourth pulse before sampling the fourth returns.

8. The method of claim 6 wherein the first, second, third, and fourth pulses are full aperture pulses.

9. The method of claim 1 further comprising:
receiving third data associated with third returns associated with the first portion of the antenna;
receiving fourth data associated with fourth returns associated with the second portion of the antenna; and
determining the angle within the beam to the target using the first data, the second data, the third data, and the fourth data.

10. The method of claim 9 wherein a focusing vector is utilized.

11. The method of claim 9 wherein $V_C$ is in a rectangular form to allow coherent integration with other vectors.

12. The method of claim 1, further comprising: receiving third data associated with third returns associated with the first portion of the antenna, wherein V1 represents a vector associated with the first data, V2 represents a vector associated with the second data, V3 represents a vector associated with the third data and the angle within the beam to the terrain is related by: arctan($V_C$)/2, where $V_C$=VA times the conjugate of VB, VA=V1 times the conjugate of VB, VA=V1 times the conjugate of V2, and VB=V2 times the conjugate of V3.

13. The method of claim 1 wherein the other vectors are related to previous calculations of $V_C$.

14. A radar system coupled to a radar antenna for receiving radar returns, the radar system for providing angle data associated with an angle to terrain, the radar system comprising:
a processor to receive data associated with the radar returns, the processor receiving first data associated with a first portion of the antenna and second data associated with a second portion of the antenna, the first portion being within, intersect with, or exclusive of the second portion, the processor calculating the angle within the beam to the terrain using the first data and the second data.

15. The radar system of claim 14 wherein the radar returns include indications of weather returns and the weather is rejected by using a lower half of a beam defined by either a point at which power is evident and integrating for approximately ½ of the beam or by beginning at a lowest point and processing until maximum power is received.

16. The radar system of claim 14 wherein the processor receives third and fourth data, the third data associated with the first portion and the fourth data associated with the second portion.

17. The radar system of claim 14 wherein the first data is coded data.

18. An apparatus, comprising:
means for receiving radar returns from a target;
means for receiving first data associated with first returns associated with a first portion of an antenna;
means for receiving second data associated with second returns associated with a second portion of an antenna, wherein the first portion includes the second portion, intersects the second portion, or is exclusive of the second portion; and
means for determining an angle within the beam to the terrain using the first and second data.

19. The apparatus of claim 18 wherein the first data and the second data are derived from coded radar pulse transmissions.

20. The apparatus of claim 18 wherein the first data and the second data are used to calculate a resultant vector, the resultant vector being in rectangular form and wherein the resultant vector is coherently integrated with other resultant vectors.

* * * * *